US010424271B2

(12) United States Patent
Endou

(10) Patent No.: US 10,424,271 B2
(45) Date of Patent: Sep. 24, 2019

(54) DISPLAY CONTROL DEVICE FOR LEFT-TO-RIGHT WRITTEN LANGUAGE AND RIGHT-TO-LEFT WRITTEN LANGUAGE

(71) Applicant: RISO KAGAKU CORPORATION, Tokyo (JP)

(72) Inventor: Tutomu Endou, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/950,563

(22) Filed: Apr. 11, 2018

(65) Prior Publication Data

US 2018/0315397 A1 Nov. 1, 2018

(30) Foreign Application Priority Data

Apr. 27, 2017 (JP) ................................ 2017-088381

(51) Int. Cl.

| | |
|---|---|
| ***G09G 5/24*** | (2006.01) |
| ***G06T 11/20*** | (2006.01) |
| ***G09G 5/16*** | (2006.01) |
| *H04N 1/00* | (2006.01) |

(52) U.S. Cl.

CPC ............ *G09G 5/246* (2013.01); *G06T 11/203* (2013.01); *G09G 5/16* (2013.01); *H04N 1/00498* (2013.01)

(58) Field of Classification Search

CPC ........ G09G 5/246; G09G 5/16; G06T 11/203; H04N 1/00498

USPC .......................................................... 345/469

See application file for complete search history.

(56) References Cited

U.S. PATENT DOCUMENTS

| | | | | |
|---|---|---|---|---|
| 2004/0225967 A1* | 11/2004 | Hassanin | G06F 9/454 | 715/760 |
| 2005/0168642 A1* | 8/2005 | Sakamoto | G06F 17/214 | 348/569 |
| 2007/0276652 A1* | 11/2007 | Oki | G06F 17/212 | 704/9 |
| 2008/0082317 A1* | 4/2008 | Rosart | G06F 17/211 | 704/8 |
| 2009/0187397 A1* | 7/2009 | Northover | G06F 17/211 | 704/8 |
| 2011/0227952 A1* | 9/2011 | Hamaguchi | G09G 5/16 | 345/672 |
| 2018/0293091 A1* | 10/2018 | Sawatari | G06F 3/0482 | |

FOREIGN PATENT DOCUMENTS

JP 2013-011671 A 1/2013

* cited by examiner

*Primary Examiner* — King Y Poon
*Assistant Examiner* — Vincent Peren
(74) *Attorney, Agent, or Firm* — Greenblum & Bernstein, P.L.C.

(57) ABSTRACT

A controller determines whether a language of an object in display data including the object and a coordinate of a rendering reference point of the object is a right-to-left writing language, and upon determining that the language of the object is the right-to-left writing language, determines an upper-right corner of a display screen of a display panel as a reference point, determines a position of the rendering reference point of the object on the display screen based on the determined reference point and the coordinate of the rendering reference point of the object included in the display data, and drives the display panel to display the object on the display screen based on the determined position of the rendering reference point on the display screen.

11 Claims, 5 Drawing Sheets

FIG. 3

| OBJECT ID | COORDINATES | REVERSE ARRANGEMENT FLAG |
|---|---|---|
| OBJECT 1 | (105,55) | 1 |
| OBJECT 2 | (100,80) | 0 |
| ⋮ | ⋮ | ⋮ |
| OBJECT 10 | (200,500) | 0 |

FIG. 4

| OBJECT ID | STRING ID |
|---|---|
| OBJECT 1 | STID0001 |
| OBJECT 2 | STID0002 |
| ⋮ | ⋮ |
| OBJECT 10 | – |

FIG. 5

| STRING ID | LANGUAGE GROUP 1 | | | | LANGUAGE GROUP 2 | LANGUAGE GROUP 3 |
|---|---|---|---|---|---|---|
| | ENGLISH | FRENCH | GERMAN | ⋯ | JAPANESE | ARABIC |
| STID0001 | title | Titre | Titel | ⋯ | タイトル | عنوان |
| STID0002 | ⋯ | ⋯ | ⋯ | ⋯ | ⋯ | ⋯ |
| ⋮ | ⋮ | ⋮ | ⋮ | ⋮ | ⋮ | ⋮ |

DISPLAY CONTROL DEVICE FOR LEFT-TO-RIGHT WRITTEN LANGUAGE AND RIGHT-TO-LEFT WRITTEN LANGUAGE

CROSS REFERENCE TO RELATED APPLICATION

This application is based upon and claims the benefit of priority from the prior Japanese Patent Application No. 2017-088381, filed on Apr. 27, 2017, the entire contents of which are incorporated herein by reference.

BACKGROUND

1. Technical Field

The disclosure relates to a display control device which displays texts and the like in a right-to-left writing language in an easily-readable way with natural appearance.

2. Related Art

There is an image forming apparatus which includes a display operation panel formed of a display screen and a touch panel covering the display screen and which makes various settings based on user operations performed on the display operation panel.

Image forming apparatuses are used in offices and the like of various countries and regions such as Japanese-speaking regions, English-speaking regions, Chinese-speaking regions, and Arabic-speaking regions.

Accordingly, messages, operation buttons, and others need to be displayed on the display operation panel in a language used in the region where the image forming apparatus is used. In languages such as Japanese and English, texts in the horizontal writing are expressed in left-to-right writing in which character strings are arranged from left to right. However, in the Middle Eastern languages such as Arabic and Hebrew, texts are expressed in right-to-left writing in which character strings are arranged from right to left.

In a general display operation panel, the coordinates of a rendering reference point which is an upper-left corner of each of the objects such as the messages and the operation buttons are determined with an upper-left corner of the display operation panel being a reference point, and the objects are rendered based on these coordinates.

In the right-to-left writing language in which texts are expressed in the right-to-left writing, if the coordinates of the rendering reference point of each of the objects such as the messages and the operation buttons are similarly determined using the upper-left corner of the display operation panel as the reference point, the following problem occurs: for example, when the objects are multiple messages of various lengths, the messages are displayed with their ends aligned and appear strange to users.

Japanese Patent Application Publication No. 2013-11671 discloses a technique relating to an information display device which, when Arabic characters are employed as a proportional font, maintains a mode of displaying setting items on the left and setting information on the right and reverses the writing order of each of a first character string and a second character string.

SUMMARY

In the technique disclosed in Japanese Patent Application Publication No. 2013-11671, when Arabic characters are employed, the mode of displaying the setting items on the left and the setting information on the right is maintained and the writing order of each of the first character string and the second character string is reversed. Accordingly, the character strings are not aligned on the right side and appear strange.

Moreover, since the mode of displaying the setting item on the left and the setting information on the right is maintained, this display is difficult to read for users in Arabic-speaking regions who have the custom of reading from right to left of the display screen.

The disclosure is directed to a display control device which displays texts and the like in a right-to-left writing language in an easily-readable way with natural appearance.

A display control device for controlling a display panel having a display screen in accordance with some embodiments includes a controller configured to drive the display panel to display an object on the display screen based on display data including the object to be displayed on the display screen and a coordinate of a rendering reference point of the object. The controller is configured to: determine whether a language of the object in the display data is a right-to-left writing language expressing texts by arranging character strings from right to left; and upon determining that the language of the object is the right-to-left writing language, determine an upper-right corner of the display screen as a reference point, determine a position of the rendering reference point of the object on the display screen based on the determined reference point and the coordinate of the rendering reference point of the object included in the display data, and drive the display panel to display the object on the display screen based on the determined position of the rendering reference point on the display screen.

The aforementioned configuration can display texts and the like in a right-to-left writing language in an easily-readable way with natural appearance.

BRIEF DESCRIPTION OF DRAWINGS

FIG. 3 is a view illustrating an example of an object list stored in an object storage included in the image forming apparatus according to the embodiment.

FIG. 4 is a view illustrating an example of a link table stored in the object storage included in the image forming apparatus according to the embodiment.

FIG. 5 is a view illustrating an example of a translation table stored in the object storage included in the image forming apparatus according to the embodiment.

DETAILED DESCRIPTION

Figure 1:
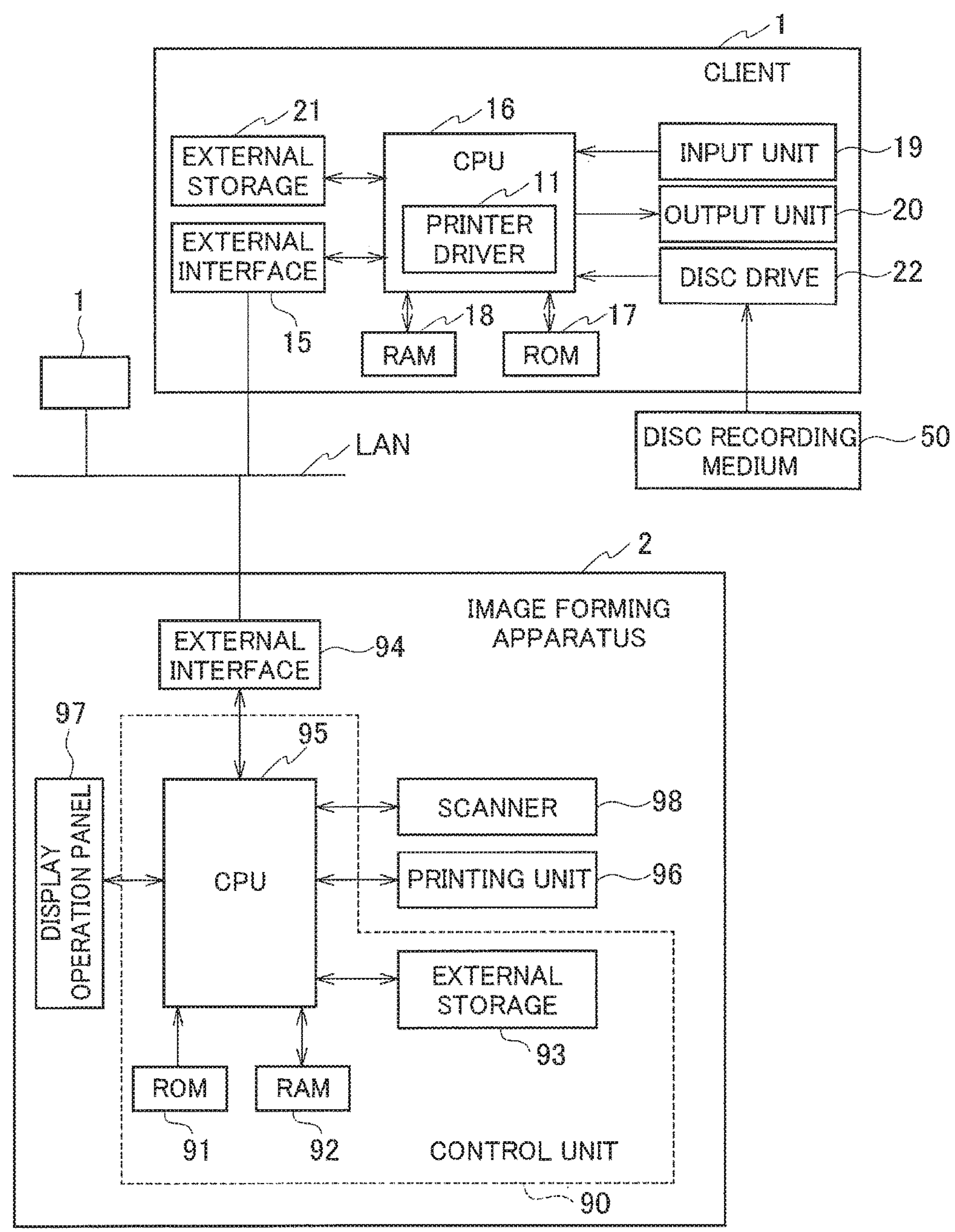
FIG. 1 is an explanatory view illustrating a schematic configuration of a printer network system including an image forming apparatus according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Overall Configuration of Printer Network System

Figure 2:
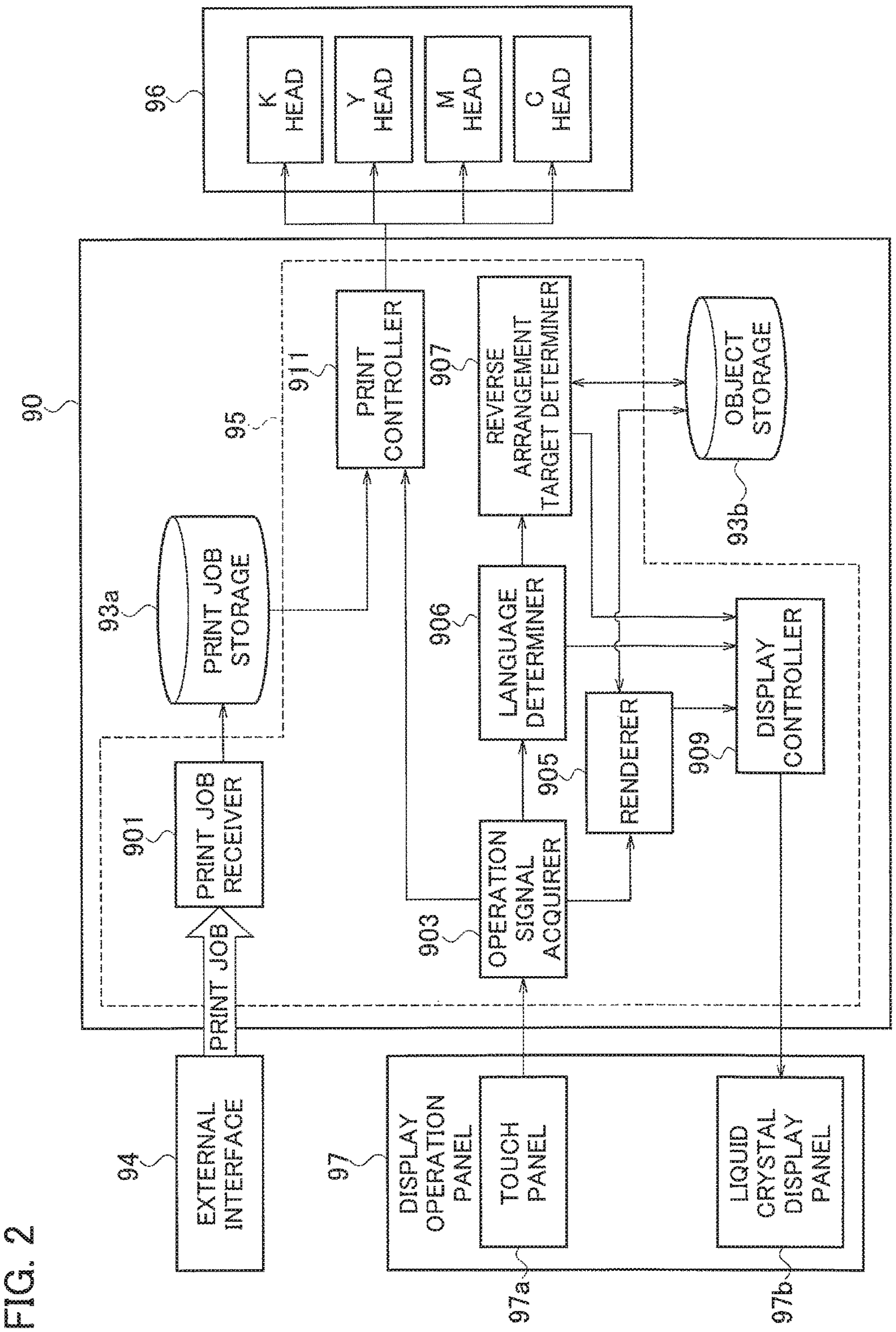
FIG. 2 is a block diagram illustrating an internal configuration virtually built on a CPU included in the image forming apparatus according to the embodiment.

FIG. 1 is an explanatory diagram illustrating a schematic configuration of a printer network system including an image forming apparatus 2 according to an embodiment of the present invention. FIG. 2 is a block diagram illustrating an internal configuration virtually built on a CPU included in the image forming apparatus 2.

As illustrated in FIG. 1, a printer network system according to the embodiment includes: the image forming apparatus 2 which has various processing functions such as a print processing function and which also functions as a display control device; and multiple clients 1 (in FIG. 1, only one client 1 is illustrated as a representative) which are connected to the image forming apparatus 2 via a network LAN.

The network LAN is a 10BASE-T, 100BASE-TX, or similar local area network (LAN) or a wireless network such as a wireless LAN (WLAN) which uses a communication protocol TCP/IP. The network LAN also includes simple networks such as, for example, a peer-to-peer home network.

Each of the clients 1 is configured by a general-purpose computer such as a personal computer (PC). The client 1 includes a CPU 16 which executes various processes based on a control program. The CPU 16 is connected to a RAM 18 which functions as a working area, a ROM 17 which stores data, and the like and is also connected to various devices via various interfaces. Specifically, the CPU 16 is connected via the various interfaces to an input unit 19 which is configured by a keyboard, a mouse, and the like, an output unit 20 which is configured by a liquid crystal display and the like, an external storage 21 such as a large-capacity storage, a disc drive 22 which reads data recorded in an external recording medium 50 and writes certain data into the external recording medium 50, and the like.

In the external storage 21, there are reserved a storage region for an application program which generates original data including print images of documents, images, and the like, a storage region for a printer driver program of the image forming apparatus 2, and a storage region for other various application programs.

The CPU 16 is a computation device configured by a processor, a memory, and other peripheral devices, and activates the application program in the external storage 21 according to an activation request received from the input unit 19. The CPU 16 generates image data indicating an image on the activated application program in response to input of parameters from the input unit 19 or the like. The generated image data is displayed and outputted on the output unit 20. Moreover, when a save request is inputted from the input unit 19, the generated image data is stored in the database region of the external storage 21.

When a request to read the image data stored in the database region of the external storage 21 is inputted from the input unit 19 while the application program is active, the image data is read from the external storage 21. The print image of the read image data can be displayed and outputted on the output unit 20 or processed on the application program to be regenerated into new image data.

When a request to print the original data generated in the original application program or the like is inputted, the CPU 16 executes the printer driver program to virtually build a printer driver 11 on the CPU. Then, the printer driver 11 outputs the print job to the image forming apparatus 2. The printer driver 11 is a data conversion program which is executed on the client 1 to control the image forming apparatus 2 connected to the client 1. When a user performs an operation of requesting printing, the printer driver 11 acquires the image data including the print image generated by the original application or the like and generates the print job according to predetermined print setting information. Then, the printer driver 11 outputs the generated print job from an external interface 15 to the image forming apparatus 2.

The image forming apparatus 2 is a color inkjet printer that includes multiple inkjet heads in which many nozzles are formed and that ejects ink of black or other color from each inkjet head to perform printing in units of lines and forms multiple images on a recording sheet on a conveyor belt such that the images are formed one on top of another.

In the embodiment, the image forming apparatus 2 includes an external interface 94 to which the external interfaces 15 of the multiple clients 1 are connected via the local area network LAN, a scanner 98 which reads image information on an original as a print image and outputs an image signal, a printing unit 96 which prints (records) the print image on a print sheet (on one side or both sides) based on the image signal outputted from the scanner 98, a display operation panel 97 which is a display unit configured to display information relating to operations on the image forming apparatus 2, and a control unit 90 which performs display control of the display operation panel 97 and also controls the entire image forming apparatus.

The control unit 90 receives the print job of the print image from each client 1. The control unit 90 generates raster data of the print image by using the received print job. The image forming apparatus 2 prints the print image onto the print sheet in the printing unit 96 under conditions specified in the print job.

The display operation panel 97 including a display screen and a touch panel covering the display screen is connected to the control unit 90. As illustrated in FIG. 2, the display operation panel 97 includes a pressure-sensitive or capacitive transparent touch panel 97*a* which is disposed on a front surface of the display operation panel 97 and a liquid crystal display panel 97*b* which is disposed on a back surface of the touch panel 97*a* and which displays various display screens including objects (button, labels, icons, and the like) corresponding to various languages. The user can perform an operation of pressing various buttons displayed on the display screen of the liquid crystal display panel 97*b* by directly touching a surface of the touch panel 97*a* with the finger or the like while viewing the display screen.

A used language which is used in the display operation panel 97 is initially set to a language used in a region in which the image forming apparatus 2 is used.

For example, in Japanese and English, texts are expressed in left-to-right writing in which character strings are arranged from left to right in horizontal writing. However, in languages of the Middle East such as Arabic and Hebrew, texts are expressed in right-to-left writing in which character strings are arranged from right to left.

Generally, when objects are displayed in the left-to-right writing language in which texts are expressed in left-to-right writing, the display is performed with an upper-left corner of the display screen being a reference point. However, when objects in the right-to-left writing language in which the texts are expressed in right-to-left writing are similarly displayed with the upper-left corner of the display screen being the reference point, the display appears strange to users who have the custom of reading from right to left of the display screen.

Accordingly, in the image forming apparatus 2, when the objects in the right-to-left writing language in which texts are expressed in right-to-left writing are displayed, the objects are displayed on the display operation panel 97 in horizontally-reverse arrangement as necessary as described later.

The control unit 90 of the image forming apparatus 2 which causes the printing unit 96 to perform a print operation includes a CPU 95 (controller). The CPU 95 is a computation processing device configured by hardware such as a processor (for example, a CPU, a digital signal processor (DSP), or the like), a memory, and other electronic circuits, software such as a program having the function of the hardware, or a combination of the hardware and the software. The CPU 95 virtually builds various function modules by reading and executing the program as necessary and performs a process relating to the image data, operation control of the units, and various processes in response to user operations. The CPU 95 controls operations of the scanner 98 and the printing unit 96 according to contents inputted and set on the display operation panel 97, based on the program and the setting information stored in the ROM 91.

The control unit 90 is provided with a RAM 92 which temporarily stores data necessary for the CPU 95 to execute various processes.

The control unit 90 is provided with an external storage 93 connected to the CPU 95.

Configuration of CPU 95

Next, internal blocks of the CPU 95 are described.

As illustrated in FIG. 2, the control unit 90 is connected to the external interface 94, the display operation panel 97, and the printing unit 96, and includes the CPU 95 and the external storage 93. Note that "module" used in the embodiment refers to a functional unit for achieving a predetermined operation which is configured by hardware such as an apparatus or a device, software having the function of the hardware, a combination of the hardware and the software, or the like.

The external storage 93 includes a print job storage 93*a* and an object storage 93*b* as storage regions. Moreover, the external storage 93 also functions as a used language storage which stores used language information indicating the used language set by a user in initial setting of the image forming apparatus 2, as described later.

The print job storage 93*a* stores the print job received by a print job receiver 901.

The object storage 93*b* stores objects and reverse arrangement flags in association with each other as an object list, the reverse arrangement flags indicating whether the objects are targets of horizontally-reverse arrangement.

FIG. 3 is a view illustrating an example of the object list stored in the object storage 93*b*. The object list is created for each display screen and is stored in the object storage 93*b*.

As illustrated in FIG. 3, in the object list, object IDs for identifying the objects such as buttons and labels which are display parts displayed on the display screen, coordinates indicating the positions of displaying the objects on the display screen, and the reverse arrangement flags indicating whether the objects need to be displayed in the horizontally-reverse arrangement are stored in association.

The reverse arrangement flags are set to "1" when the objects need to be displayed in the horizontally-reverse arrangement, and are set to "0" when the objects do not have to be displayed in the horizontally-reverse arrangement.

This is because some objects are easier for the user to view when rendered in the horizontally-reverse arrangement with the upper-right corner of the display screen being the reference point while other objects are harder for the user to view when rendered in the horizontally-reverse arrangement with the upper-right corner of the display screen being the reference point. Accordingly, the reverse arrangement flag is set for each object in the object list.

The object storage 93*b* stores a link table.

FIG. 4 is a view illustrating an example of the link table stored in the object storage 93*b*.

As illustrated in FIG. 4, in the link table, the object IDs and string IDs are stored in association, the string IDs uniquely assigned to the respective objects when the objects are labels and the like and are targets of translation.

The control unit 90 can determine a string ID corresponding to a certain object ID by referring to this link table.

The object storage 93*b* stores a translation table.

FIG. 5 is a view illustrating an example of the translation table stored in the object storage 93*b*.

As illustrated in FIG. 5, in the translation table, for each string ID, pieces of data of the object in which character strings are translated into English, Japanese, Arabic, and the like are stored in association.

Accordingly, the control unit 90 can determine the string ID corresponding to the object ID by referring to the aforementioned link table, and thereby determine the object corresponding to the determined string ID and translated into a specified language.

A language group refers to a group of similar languages. In this example, a language group 1 and a language group 2 are set as groups of left-to-right writing languages in which texts are expressed by arranging character strings from left to right. A language group 3 is set as a group of right-to-left writing languages in which texts are expressed by arranging character strings from right to left.

Although not illustrated, the external storage 93 stores format data for the display screen and data of objects which require no translation such as icons. The data of icons is stored in association with the object IDs.

The external storage 93 stores data of the display screen displayed on the display operation panel 97 with various objects arranged in the format of the display screen.

The CPU 95 includes, for its functions, the print job receiver 901, an operation signal acquirer 903, a print controller 911, a renderer 905, a language determiner 906, a reverse arrangement target determiner 907, and a display controller 909.

The print job receiver 901 is a module which receives the print job and stores the received print job in the print job storage 93*a*. For example, the print job receiver 901 receives the print job including the image data from a connected user terminal (not illustrated) via the external interface 94 and stores the print job in the print job storage 93*a*.

The operation signal acquirer 903 is a module which acquires operation signals detected by the touch panel 97*a* when the user performs operations of pressing the buttons displayed on the touch panel 97*a*, and sends the operation signals to the print controller 911, the renderer 905, and the language determiner 906.

The print controller 911 is a module which controls the entire image formation process by controlling drive of the inkjet heads of the respective colors and operations of drive units in a conveyance route, and performs image formation at timing and print speed according to a schedule. More specifically, the print controller 911 performs printing in units of lines by ejecting ink from each of inkjet heads 96C, 96M, 96Y, 96K to the conveyed sheet with the number of drops set to any of zero to seven, based on the operation signal acquired by the operation signal acquirer 903 and the image data included in the print job stored in the print job storage 93*a*.

The renderer 905 is a module which generates the objects to be displayed on the display screen of the display operation panel 97 when receiving a signal instructing screen switching based on the user operation from the display operation panel 97. Specifically, the renderer 905 extracts the object ID of each of the objects included in the display screen to be displayed, from the object list stored in the object storage 93*b* and refers to the link table to determine whether there is a string ID corresponding to the extracted object ID. When there is a string ID corresponding to the object ID, the renderer 905 extracts the corresponding string ID. Then, the renderer 905 refers to the translation table stored in the object storage 93*b* to extract the object corresponding to the determined string ID and translated into the specified language. When there is no string ID corresponding to the object ID, the renderer 905 extracts an image of the object corresponding to the extracted object ID from the external storage 93.

The renderer 905 can thereby generate the objects to be displayed on the display screen.

The language determiner 906 is a module which reads the used language stored in the external storage 93 as the language of the objects and determines whether the language of the objects is the right-to-left writing language in which texts are expressed by arranging character strings from right to left. In this example, the language group 1 and the language group 2 are set as groups of left-to-right writing languages in which texts are expressed by arranging character strings from left to right, and the language group 3 is set as a group of right-to-left writing languages in which texts are expressed by arranging character strings from right to left. For example, when the used language specified in the initial setting of the apparatus and stored in the external storage 93 is Arabic, the language determiner 906 determines that the language of the objects is the right-to-left writing language.

The reverse arrangement target determiner 907 is a module which determines whether each of the objects included in the display screen is a target of horizontally-reverse arrangement, based on the object list stored in the object storage 93*b*. Specifically, the reverse arrangement target determiner 907 determines that the object whose reverse arrangement flag is set to "1" in the object list is the target of the horizontally-reverse arrangement, and determines that the object whose reverse arrangement flag is set to "0" in the object list is not the target of the horizontally-reverse arrangement.

The display controller 909 sets the used language based on the touch operation performed by the user on the display operation panel 97 in the initial setting of the image forming apparatus 2. For example, when the used language is set to Arabic by the user operation, the used language information indicating that Arabic is set as the used language is stored in the external storage 93.

When the language determiner 906 determines that the language of the objects is the left-to-right writing language, the display controller 909 sets the upper-left corner of the display screen of the display operation panel 97 as the reference point (determine the upper-left corner as the reference point), sets (determines), based on the set reference point, the coordinates of rendering reference points of the to-be-displayed objects on the display operation panel 97 in display data, and displays the to-be-displayed objects on the display operation panel 97. This can set the upper-left corner of the display screen of the display operation panel 97 as the reference point of the coordinates on the display screen, set an upper-left corner of each object as the rendering reference point, and display the object on the display screen such that the rendering reference point of the object is disposed at a position indicated by the coordinates of the rendering reference point of the object on the display screen in the display data.

Figure 6:
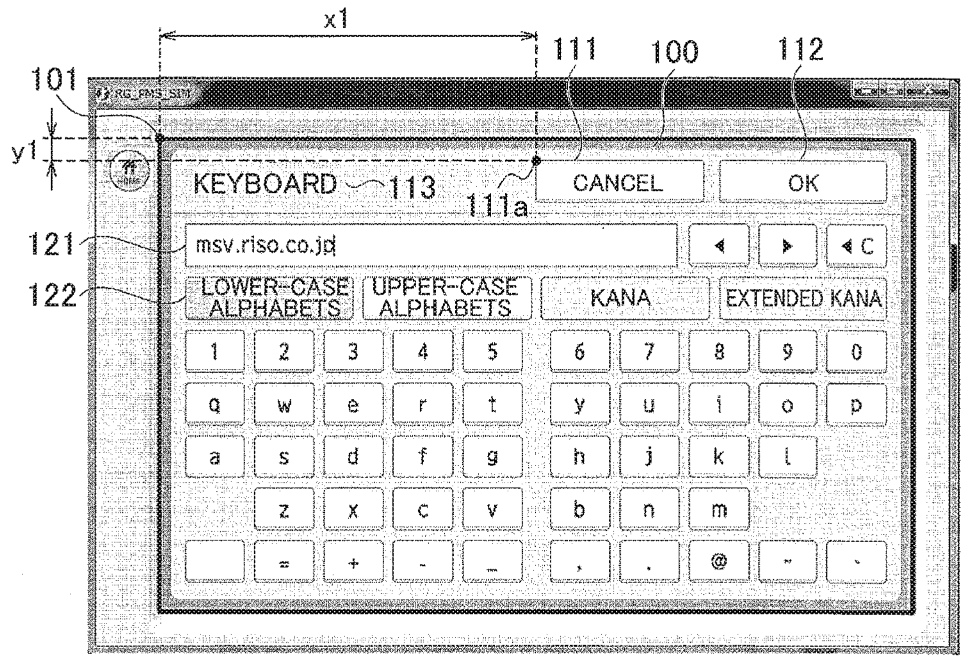
FIG. 6 is a view illustrating an example of a display screen displayed by a display controller included in the image forming apparatus according to the embodiment when the language of an object is determined to be a left-to-right writing language.

FIG. 6 is a view illustrating an example of the display screen displayed by the display controller 909 when the language of the objects is determined to be the left-to-right writing language.

As illustrated in FIG. 6, when the language of the objects is determined to be the left-to-right writing language (Japanese in this case), a reference point 101 is set to be the upper-left corner of a display screen 100. Objects such as buttons 111, 112, a label 113, a text box 121, and a buttons 122 are displayed on the display screen 100.

For example, the button 111 is rendered such that the upper-left corner of the object is set as a rendering reference point 111*a* and the rendering reference point 111*a* is disposed at a position indicated by coordinates (x1, y1) described in the object list based on the reference point 101. The button 112, the label 113, the text box 121, and the buttons 122 which are the other objects are each similarly rendered such that the upper-left corner of the object is set as the rendering reference point and the rendering reference point is disposed at a position indicated by coordinates based on the reference point 101.

Meanwhile, when the language determiner 906 determines that the language of the objects is the right-to-left writing language, the display controller 909 displays the objects determined to be targets of horizontally-reverse arrangement by the reverse arrangement target determiner 907 in the horizontally-reverse arrangement. Specifically, the display controller 909 sets the upper-right corner of the display screen of the display operation panel 97 as the reference point (determine the upper-right corner as the reference point), sets (determines), based on the set reference point, the coordinates of rendering reference points of the to-be-displayed objects on the display operation panel 97 in display data, and displays the to-be-displayed objects on the display operation panel 97. This can set the upper-right corner of the display screen of the display operation panel 97 as the reference point of the coordinates on the display screen, set an upper-right corner of each object as the rendering reference point, and display the object on the display screen such that the rendering reference point of the object is disposed at a position indicated by the coordinates of the rendering reference point of the object on the display screen in the display data.

The display controller 909 does not display, in the horizontally-reverse arrangement, the objects which are determined to be the right-to-left writing language by the language determiner 906 but which are determined not to be the targets of horizontally-reverse arrangement by the reverse arrangement target determiner 907. For such objects, the display controller 909 sets the upper-left corner of the display screen as the reference point, sets the upper-left corner of each object as the rendering reference point, and displays the object on the display screen such that the rendering reference point thereof is set at the position indicated by the coordinates based on the reference point, based on the display data.

Figure 7:
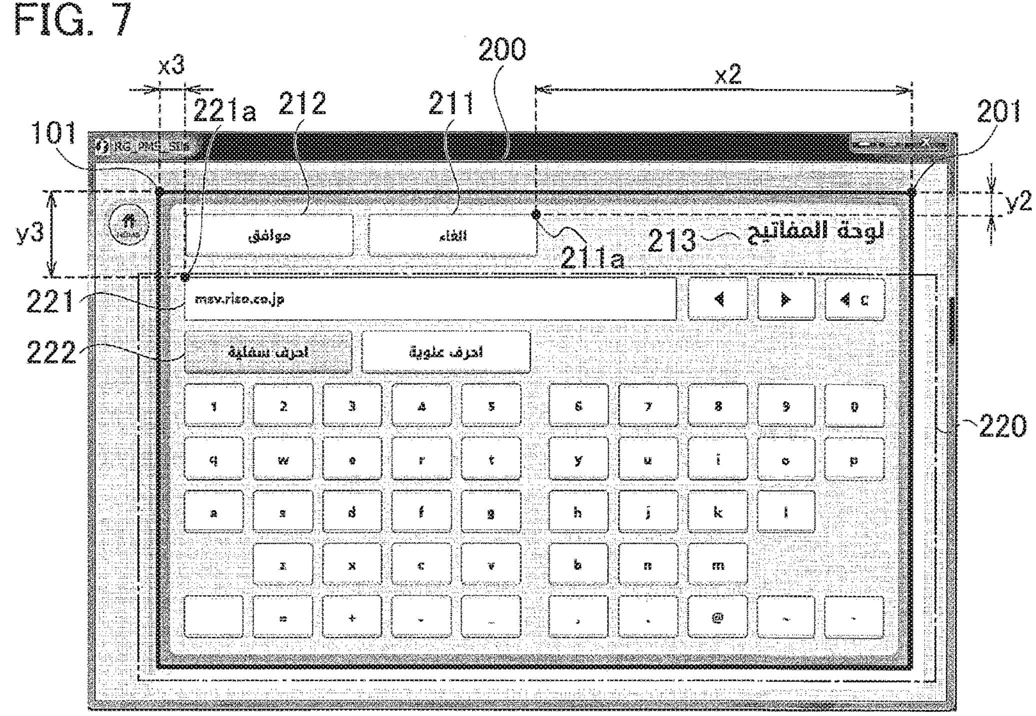
FIG. 7 is a view illustrating an example of the display screen displayed by the display controller included in the image forming apparatus according to the embodiment when the language of the object is determined to be a right-to-left writing language.

FIG. 7 is a view illustrating an example of the display screen displayed by the display controller 909 when the language of the object is determined to be the right-to-left writing language.

As illustrated in FIG. 7, when the language of the object is determined to be the right-to-left writing language, a reference point 201 for the right-to-left writing language is set to be the upper-right corner of a display screen 200. Objects such as buttons 211, 212, a label 213, a text box 221, and a buttons 222 are displayed on the display screen 200. The buttons 211, 212 and the label 213 are objects which are easier for the user to view when rendered in the horizontally-reverse arrangement with the upper-right corner of the display screen being the reference point. Meanwhile, the objects such as the text box 221 and the buttons 222 which are included in a display region 220 include keyboard arrangements and the like. Accordingly, if these objects are rendered in the horizontally-reverse arrangement with the upper-right corner of the display screen being the reference point, the objects are harder for the user to view. Hence, in the object list, the reverse arrangement flags corresponding to the buttons 211, 212 and the label 213 are set to “1” while the reverse arrangement flags corresponding to the objects such as the text box 221 and the buttons 222 which are included in the display region 220 are set to “0.”

Accordingly, for example, the button 211 whose reverse arrangement flag is set to “1” is rendered such that the upper-right corner of the object is set as a rendering reference point 211*a* and the rendering reference point 211*a* is disposed at a position indicated by the coordinates (x2, y2) described in the object list based on the reference point 201.

Meanwhile, the objects such as the text box 221 and the buttons 222 which are included in the display region 220 and whose reverse arrangement flags are set to “0” are not rendered in the reverse arrangement. For example, the text box 221 is rendered such that an upper-left corner of the object is set as a rendering reference point 221*a* and the rendering reference point 221*a* is disposed at a position indicated by the coordinates (x3, y3) described in the object list based on the reference point 101.

Next, operations of the image forming apparatus 2 are described.

Figure 8:
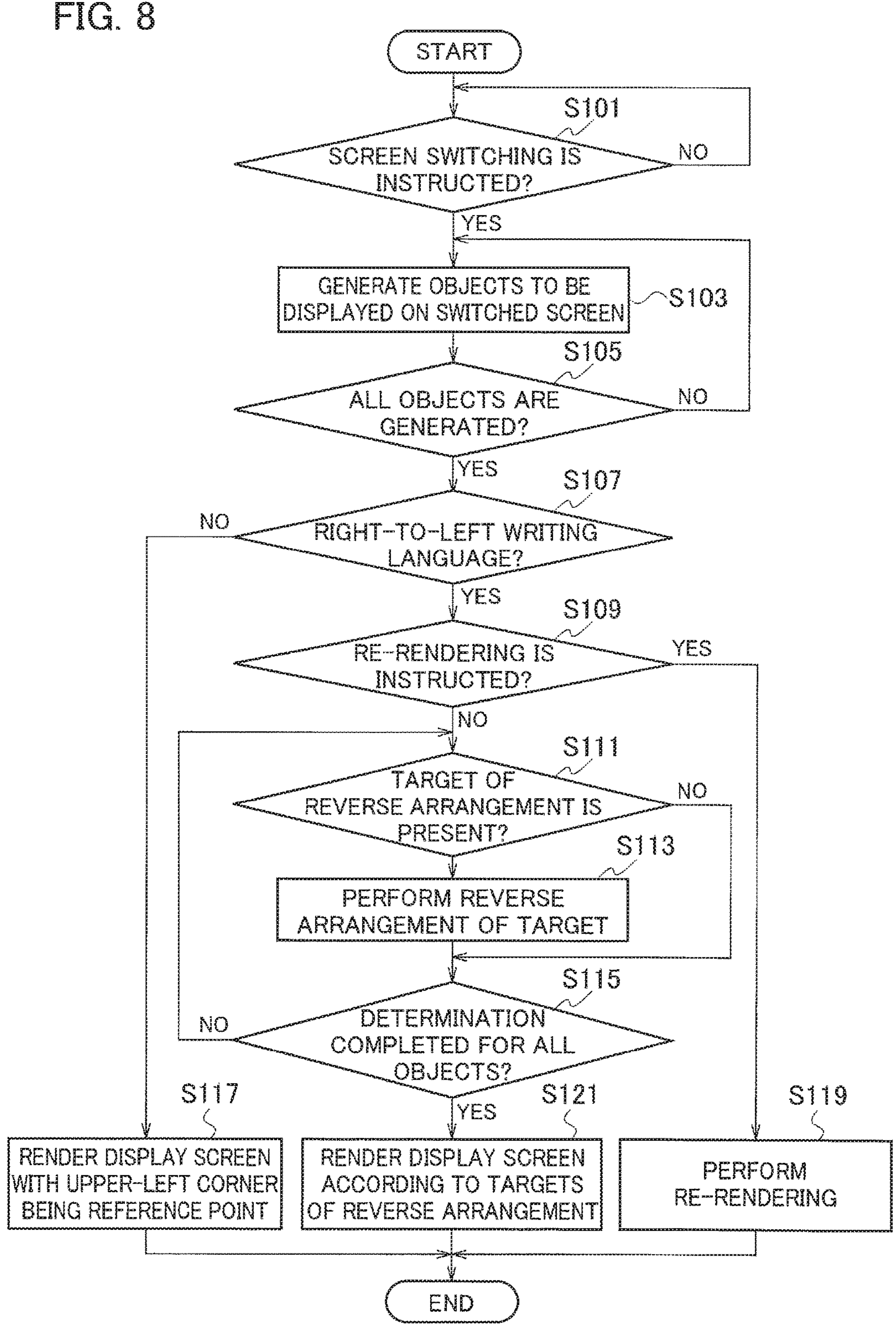
FIG. 8 is a flowchart explaining process contents of the image forming apparatus according to the embodiment.

FIG. 8 is a flowchart explaining process contents of the image forming apparatus 2.

As illustrated in FIG. 8, when the user performs a touch operation on the display operation panel 97 to request for the switching of the display screen (step S101; YES), the renderer 905 generates the objects to be displayed on the display screen of the display operation panel 97 (step S103).

When all objects to be displayed on the display screen for which the switching is requested are generated (step S105; YES), the language determiner 906 determines whether the language of the display data is the right-to-left writing language in which texts are expressed by arranging character strings from right to left (step S107).

When the language of the display data is determined not to be the right-to-left writing language, that is determined to be the left-to-right writing language (step S107; NO), the display controller 909 sets the upper-left corner of the display screen of the display operation panel 97 as the reference point, sets, based on the set reference point, the coordinates of the rendering reference points of the to-be-displayed objects on the display operation panel 97 in the display data, and displays the to-be-displayed objects on the display operation panel 97 (step S117).

Meanwhile, when the language of the display data is determined to be the right-to-left writing language (step S107; YES), the display controller 909 determines whether re-rendering is instructed (step S109). As described above, the external storage 93 stores the data of the display screen displayed on the display operation panel 97. Accordingly, the display controller 909 determines that the re-rendering is requested when the data of the display screen for which the switching is requested in step S101 is stored in in the external storage 93.

When the display controller 909 determines that the re-rendering is requested (step S109; YES), the display controller 909 executes the re-rendering based on the data of the display screen stored in the external storage 93 (step S119).

Meanwhile, when the display controller 909 determines that the re-rendering is not requested (step S109; NO), that is transition of the display screen is requested, the display controller 909 has to newly generate a display screen corresponding to the right-to-left writing language.

Thus, the reverse arrangement target determiner 907 determines whether each of the objects to be displayed on the display screen for which the switching is requested is an object being the target of reverse arrangement, based on the object list stored in the object storage 93*b* (step S111).

When the reverse arrangement target determiner 907 determines that there is an object being the target of reverse arrangement (step S111; YES), the display controller 909 displays the object determined to be the target of horizontally-reverse arrangement by the reverse arrangement target determiner 907, in the horizontally-reverse arrangement. Specifically, the display controller 909 sets the upper-right corner of the display screen of the display operation panel 97 as the reference point, sets, based on the set reference point, the coordinates of the rendering reference point of the to-be-displayed object on the display operation panel 97 in the display data, and displays the to-be-displayed objects on the display operation panel 97 (step S113). Note that, in default, the upper-left corner of the display screen is set as the reference point and the upper-left corner of each object is set as the rendering reference point. Accordingly, when the reverse arrangement target determiner 907 determines that there is no object being the target of reverse arrangement (step S111; NO), the objects are arranged on the display screen without being displayed in the horizontally-reverse arrangement.

Then, when the determination of the target of reverse arrangement is completed for all objects (step S115; YES), the display controller 909 renders the display screen in correspondence with the targets of reverse arrangement (step S121). Specifically, for the objects determined to be the targets of horizontally-reverse arrangement by the reverse arrangement target determiner 907, the display controller 909 sets the upper-right corner of the display screen of the display operation panel 97 as the reference point, sets, based on the set reference point, the coordinates of the rendering reference points of the to-be-displayed objects on the display operation panel 97 in the display data, and displays the to-be-displayed objects on the display operation panel 97. Meanwhile, the display controller 909 does not display the objects which are determined not to be the targets of horizontally-reverse arrangement by the reverse arrangement target determiner 907, in the horizontally-reverse arrangement. For such objects, the display controller 909 sets the upper-left corner of the display screen of the display operation panel 97 as the reference point, sets, based on the set reference point, the coordinates of the rendering reference points of the to-be-displayed objects on the display operation panel 97 in the display data, and displays the to-be-displayed objects on the display operation panel 97.

As described above, in the embodiment, when the language of the display data is determined to be the right-to-left writing language, the display controller 909 sets the upper-right corner of the display screen of the display operation panel 97 as the reference point, sets, based on the set reference point, the coordinates of the rendering reference points of the to-be-displayed objects on the display operation panel 97 in the display data, and displays the to-be-displayed objects on the display operation panel 97.

Accordingly, when the right-to-left writing language such as Arabic is employed, the objects are displayed with the upper-right corner of the display screen being the reference point and with the upper-right corner of each object being the rendering reference point. The objects are thereby aligned to the right and appear natural. Moreover, it is possible to provide a display easier to read for the user in a linguistic area of the right-to-left writing who has the custom of reading from right to left of the display screen.

Moreover, in the embodiment, the language determiner 906 reads the used language stored in the external storage 93 as the language of the objects and determines whether the language of the objects is the right-to-left writing language in which texts are expressed by arranging character strings from right to left. When the language is determined to be the right-to-left writing language, in response to the request of transition of the display screen, the display controller 909 sets the upper-right corner of the display screen of the display operation panel 97 as the reference point, sets, based on the set reference point, the coordinates of the rendering reference points of the to-be-displayed objects on the display operation panel 97 in the display data, and displays the to-be-displayed objects on the display operation panel 97.

Accordingly, the display screen corresponding to the used language can be displayed without reconnecting power of the image forming apparatus 2.

When the language determiner 906 determines that the language of the objects is the right-to-left writing language, the display controller 909 performs the following operations: for the objects determined to be the targets of horizontally-reverse arrangement by the reverse arrangement target determiner 907, the display controller 909 sets the upper-right corner of the display screen of the display operation panel 97 as the reference point, sets, based on the set reference point, the coordinates of the rendering reference points of the to-be-displayed objects on the display operation panel 97 in the display data, and displays the to-be-displayed objects on the display operation panel 97; for the objects which are determined not to be the targets of horizontally-reverse arrangement by the reverse arrangement target determiner 907, the display controller 909 sets the upper-left corner of the display screen of the display operation panel 97 as the reference point, sets, based on the set reference point, the coordinates of the rendering reference points of the to-be-displayed objects on the display operation panel 97 in the display data, and displays the to-be-displayed objects on the display operation panel 97.

Accordingly, each of the objects can be set to be displayed with the upper-right corner of the display screen being the reference point or with the upper-left corner of the display screen being the reference point, by setting in advance whether the object is the target of horizontally-reverse arrangement.

When the language of the objects is the right-to-left writing language, this allows the objects to be displayed in one display screen such that the objects which are easier to view when displayed with the upper-right corner of the display screen set as the reference point are displayed with the upper-right corner of the display screen set as the reference point and the objects which are easier to view when displayed with the upper-left corner of the display screen set as the reference point are displayed with the upper-left corner of the display screen set as the reference point. Accordingly, a natural display screen easier for the user to view can be displayed.

In the embodiment, description is given of the example in which the image forming apparatus 2 functions as the display control device. However, the present invention is not limited to this, and the client 1 including the display operation panel 97 may be configured to function as the display control device.

A display control device in some embodiments has, for example, the following configuration. A display control device for controlling a display panel having a display screen includes a controller configured to drive the display panel to display an object on the display screen based on display data including the object to be displayed on the display screen and a coordinate of a rendering reference point of the object. The controller is configured to: determine whether a language of the object in the display data is a right-to-left writing language expressing texts by arranging character strings from right to left; and upon determining that the language of the object is the right-to-left writing language, determine an upper-right corner of the display screen as a reference point, determine a position of the rendering reference point of the object on the display screen based on the determined reference point and the coordinate of the rendering reference point of the object included in the display data, and drive the display panel to display the object on the display screen based on the determined position of the rendering reference point on the display screen.

The display control device may further include a used language storage configured to store a used language. The controller may be configured to: read the used language stored in the used language storage as the language of the object and determine whether the language is the right-to-left writing language, and upon determining that the language of the object is the right-to-left writing language, in response to a request of transition of the display screen, determine the upper-right corner of the display screen as the reference point, determine the position of the rendering reference point of the object on the display screen based on the determined reference point and the coordinate of the rendering reference point of the object included in the display data, and drive the display panel to display the object on the display screen based on the determined position of the rendering reference point on the display screen.

The display control device may further include an object storage configured to store the object and a reverse arrangement flag indicating whether the object is a target of horizontally-reverse arrangement in association with each other as an object list. The controller may be configured to: determine whether the object is the target of horizontally-reverse arrangement based on the object list; upon determining that the language of the object is the right-to-left writing language and that the object is the target of horizontally-reverse arrangement, determine the upper-right corner of the display screen as the reference point; and upon determining that the language of the object is the right-to-left writing language and that the object is not the target of horizontally-reverse arrangement, determine an upper-left corner of the display screen as the reference point.

The controller may be configured to: upon determining that the language of the object is the right-to-left writing language and that the object is the target of horizontally-reverse arrangement, determine the upper-right corner of the display screen as the reference point and determine an upper-right corner of the object as a position of the rendering reference point in the object; upon determining that the language of the object is the right-to-left writing language and that the object is not the target of horizontally-reverse arrangement, determine the upper-left corner of the display screen as the reference point and determine an upper-left corner of the object as a position of the rendering reference point in the object; determine the position of the rendering reference point of the object on the display screen based on the determined reference point and the coordinate of the rendering reference point of the object included in the display data; and drive the display panel to display the object on the display screen based on the determined position of the rendering reference point in the object and the determined position of the rendering reference point on the display screen.

The object may include a first object and a second object. The display control device may further include an object storage configured to store the first object and a first reverse arrangement flag indicating whether the first object is a target of horizontally-reverse arrangement in association with each other as an object list and store the second object and a second reverse arrangement flag indicating whether the second object is the target of horizontally-reverse arrangement in association with each other as the object list. The controller may be configured to: determine whether each of the first object and the second object is the target of horizontally-reverse arrangement based on the object list; upon determining that the language of the first object is the right-to-left writing language and that the first object is the target of horizontally-reverse arrangement, determine the upper-right corner of the display screen as the reference point, determine a position of the rendering reference point of the first object on the display screen based on the determined reference point and the coordinate of the rendering reference point of the first object included in the display data, and drive the display panel to display the first object on the display screen based on the determined position of the rendering reference point of the first object on the display screen; and upon determining that the language of the second object is the right-to-left writing language and that the second object is not the target of horizontally-reverse arrangement, determine an upper-left corner of the display screen as the reference point, determine a position of the rendering reference point of the second object on the display screen based on the determined reference point and the coordinate of the rendering reference point of the second object included in the display data, and drive the display panel to display the second object on the display screen based on the determined position of the rendering reference point of the second object on the display screen.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A display control device for controlling a display panel having a display screen, the display control device comprising a controller configured to drive the display panel to display an object on the display screen based on display data including the object to be displayed on the display screen and a coordinate of a rendering reference point of the object; and an object storage configured to store the object and a reverse arrangement flag indicating whether the object is a target of horizontally-reverse arrangement in association with each other as an object list, wherein the controller is configured to:

determine whether a language of the object in the display data is a right-to-left writing language expressing texts by arranging character strings from right to left or a left-to-right writing language expressing texts by arranging character strings from left-to-right;

upon determining that the language of the object is the right-to-left writing language, determine an upper-right corner of the display screen as a reference point, determine a position of the rendering reference point of the object on the display screen based on the determined reference point and the coordinate of the rendering reference point of the object included in the display data, and drive the display panel to display the object on the display screen based on the determined position of the rendering reference point on the display screen, determine whether the object is the target of horizontally-reverse arrangement based on the object list;

upon determining that the language of the object is the right-to-left writing language and that the object is the target of horizontally-reverse arrangement, determine the upper-right corner of the display screen as the reference point;

upon determining that the language of the object is the right-to-left writing language and that the object is not the target of horizontally-reverse arrangement, determine an upper-left corner of the display screen as the reference point, and upon determining that the language of the object is the left-to-right writing language, determine an upper-left corner of the display screen as the reference point and drive the display panel to display the object on the display screen without horizontally reversing the object.

2. The display control device according to claim 1, further comprising a used language storage configured to store a used language, wherein the controller is configured to:

read the used language stored in the used language storage as the language of the object and determine whether the language is the right-to-left writing language, and upon determining that the language of the object is the right-to-left writing language, in response to a request of transition of the display screen, determine the upper-right corner of the display screen as the reference point, determine the position of the rendering reference point of the object on the display screen based on the determined reference point and the coordinate of the rendering reference point of the object included in the display data, and drive the display panel to display the object on the display screen based on the determined position of the rendering reference point on the display screen.

3. The display control device according to claim 2, wherein the object includes a first object and a second object, the display control device further comprises an object storage configured to store the first object and a first reverse arrangement flag indicating whether the first object is a target of horizontally-reverse arrangement in association with each other as an object list and store the second object and a second reverse arrangement flag indicating whether the second object is the target of horizontally-reverse arrangement in association with each other as the object list, and the controller is configured to:

determine whether each of the first object and the second object is the target of horizontally-reverse arrangement based on the object list;

upon determining that the language of the first object is the right-to-left writing language and that the first object is the target of horizontally-reverse arrangement, determine the upper-right corner of the display screen as the reference point, determine a position of the rendering reference point of the first object on the display screen based on the determined reference point and the coordinate of the rendering reference point of the first object included in the display data, and drive the display panel to display the first object on the display screen based on the determined position of the rendering reference point of the first object on the display screen; and upon determining that the language of the second object is the right-to-left writing language and that the second object is not the target of horizontally-reverse arrangement, determine an upper-left corner of the display screen as the reference point, determine a position of the rendering reference point of the second object on the display screen based on the determined reference point and the coordinate of the rendering reference point of the second object included in the display data, and drive the display panel to display the second object on the display screen based on the determined position of the rendering reference point of the second object on the display screen.

4. The display control device according to claim 2, wherein the object storage further stores, for each object, an object ID, coordinates indicating a position at which the object is displayed on the display screen, and the reverse arrangement flag, in association with each other.

5. The display control device according to claim 4, where the object storage further stores a link table in which, for each object, the object ID and a string ID is stored in association with each other, the string IDs being assigned to the respective objects when the objects are targets of translation.

6. The display control device according to claim 5, wherein the object storage further stores a translation table, in which, for each string ID, data of the object, in which character strings are translated into a plurality of languages are stored, in association with each other.

7. The display control device according to claim 1, wherein the controller is configured to:

upon determining that the language of the object is the right-to-left writing language and that the object is the target of horizontally-reverse arrangement, determine the upper-right corner of the display screen as the reference point and determine an upper-right corner of the object as the rendering reference point of the object;

upon determining that the language of the object is the right-to-left writing language and that the object is not the target of horizontally-reverse arrangement, determine the upper-left corner of the display screen as the reference point and determine an upper-left corner of the object as the rendering reference point of the object;

determine the position of the rendering reference point of the object on the display screen based on the determined reference point and the coordinate of the rendering reference point of the object included in the display data; and drive the display panel to display the object on the display screen based on the determined position of the rendering reference point in the object and the determined position of the rendering reference point on the display screen.

8. The display control device according to claim 1, wherein the object includes a first object and a second object, the display control device further comprises an object storage configured to store the first object and a first reverse arrangement flag indicating whether the first object is a target of horizontally-reverse arrangement in association with each other as an object list and store the second object and a second reverse arrangement flag indicating whether the second object is the target of horizontally-reverse arrangement in association with each other as the object list, and the controller is configured to:

determine whether each of the first object and the second object is the target of horizontally-reverse arrangement based on the object list;

upon determining that the language of the first object is the right-to-left writing language and that the first object is the target of horizontally-reverse arrangement, determine the upper-right corner of the display screen as the reference point, determine a position of the rendering reference point of the first object on the display screen based on the determined reference point and the coordinate of the rendering reference point of the first object included in the display data, and drive the display panel to display the first object on the display screen based on the determined position of the rendering reference point of the first object on the display screen; and upon determining that the language of the second object is the right-to-left writing language and that the second object is not the target of horizontally-reverse arrangement, determine an upper-left corner of the display screen as the reference point, determine a position of the rendering reference point of the second object on the display screen based on the determined reference point and the coordinate of the rendering reference point of the second object included in the display data, and drive the display panel to display the second object on the display screen based on the determined position of the rendering reference point of the second object on the display screen.

9. The display control device according to claim 1, wherein the object storage further stores, for each object, an object ID, coordinates indicating a position at which the object is displayed on the display screen, and the reverse arrangement flag, in association with each other.

10. The display control device according to claim 9, where the object storage further stores a link table in which, for each object, the object ID and a string ID is stored in association with each other, the string IDs being assigned to the respective objects when the objects are targets of translation.

11. The display control device according to claim 10, wherein the object storage further stores a translation table, in which, for each string ID, data of the object, in which character strings are translated into a plurality of languages are stored, in association with each other.

* * * * *